(12) United States Patent
Franzius et al.

(10) Patent No.: US 12,030,182 B2
(45) Date of Patent: Jul. 9, 2024

(54) CONTROLLING AN AUTONOMOUS WORKING DEVICE BASED ON PHYSICAL INTERACTION

(71) Applicant: Honda Research Institute Europe GmbH, Offenbach/Main (DE)

(72) Inventors: Mathias Franzius, Offenbach (DE); Nils Einecke, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 169 days.

(21) Appl. No.: 17/120,283

(22) Filed: Dec. 14, 2020

(65) Prior Publication Data

US 2022/0184801 A1 Jun. 16, 2022

(51) Int. Cl.
| | |
|---|---|
| *B25J 9/16* | (2006.01) |
| *A01D 34/00* | (2006.01) |
| *A47L 9/28* | (2006.01) |
| *B25J 11/00* | (2006.01) |

(Continued)

(52) U.S. Cl.
CPC ............ *B25J 9/163* (2013.01); *A01D 34/008* (2013.01); *A47L 9/2805* (2013.01); *A47L 9/2847* (2013.01); *B25J 9/1664* (2013.01); *B25J 9/1694* (2013.01); *B25J 11/0085* (2013.01); *B25J 13/087* (2013.01); *B25J 13/088* (2013.01);

(Continued)

(58) Field of Classification Search
CPC ........ B25J 9/163; B25J 9/1664; B25J 9/1694; B25J 11/0085; B25J 13/087; B25J 13/088; A01D 34/008; A01D 34/006; A01D 2201/00
See application file for complete search history.

(56) References Cited

U.S. PATENT DOCUMENTS

| | | | |
|---|---|---|---|
| 9,232,692 B2 | 1/2016 | Bjorn et al. | |
| 9,505,129 B2 | 11/2016 | Yamamoto | |
| 10,545,497 B1 * | 1/2020 | Cui | ...................... G05D 1/0016 |

(Continued)

FOREIGN PATENT DOCUMENTS

| | | |
|---|---|---|
| CN | 110597112 | 12/2019 |
| EP | 2667223 | 11/2013 |

(Continued)

OTHER PUBLICATIONS

Yoshikazu Koide, et al., "An Approach to Integrating an Interactive Guide Robot with Ubiquitous Sensors," 2004 IEEE/RSJ International Conference on Intelligent Robots and Systems (IROS) (IEEE Cat. No.04CH37566), vol. 3, Jan. 2004, pp. 1-6.

(Continued)

*Primary Examiner* — Khoi H Tran
*Assistant Examiner* — Nhi Q Bui
(74) *Attorney, Agent, or Firm* — JCIPRNET

(57) ABSTRACT

An autonomous working device comprises at least one sensor configured to generate a sensor signal based on a physical interaction of the autonomous working device with a physical entity, at least one actuator configured to perform a working task, and a controller configured to generate a control signal for controlling the actuator. The controller is configured to evaluate the sensor signal, to determine a pattern of a physical interaction of the autonomous working device with a person and to generate the control signal based on the determined pattern of a physical interaction.

16 Claims, 11 Drawing Sheets

(51) Int. Cl.
*B25J 13/08* (2006.01)
*A01D 101/00* (2006.01)

(52) U.S. Cl.
CPC ....... *A01D 2101/00* (2013.01); *A47L 2201/04* (2013.01)

(56) References Cited

U.S. PATENT DOCUMENTS

| | | | | |
|---|---|---|---|---|
| 2002/0120361 | A1* | 8/2002 | Kuroki | G05B 19/00 700/264 |
| 2012/0173018 | A1* | 7/2012 | Allen | B25J 5/007 700/245 |
| 2014/0316636 | A1* | 10/2014 | Hong | G01C 21/206 901/1 |
| 2018/0184874 | A1* | 7/2018 | Song | A47L 9/2894 |
| 2019/0143528 | A1* | 5/2019 | Hayashi | B25J 11/0015 700/245 |
| 2019/0302791 | A1* | 10/2019 | Nageswaran | G05D 1/0088 |

FOREIGN PATENT DOCUMENTS

| | | |
|---|---|---|
| EP | 4132259 | 2/2023 |
| JP | 2005246564 A * | 9/2005 |
| KR | 100865110 B * | 10/2008 |
| WO | 2014007728 | 1/2014 |
| WO | 2014090901 | 6/2014 |
| WO | WO-2021204525 A1 * | 10/2021 ........... A01D 34/001 |

OTHER PUBLICATIONS

"Third Party Observation of Europe Counterpart Application", mailed on Mar. 6, 2023, pp. 1-7.

* cited by examiner

CONTROLLING AN AUTONOMOUS WORKING DEVICE BASED ON PHYSICAL INTERACTION

TECHNICAL FIELD

The invention is in the field of autonomous working devices, and in particular, control of autonomous working devices such as cleaning robots or autonomous lawnmowers based on a physical interaction with a person.

BACKGROUND

The autonomous working device is an autonomously operating device that performs a useful task for humans or for equipment excluding applications of industrial automation. The autonomous working device performs its task in a working area, in which humans may be present and come into contact with the autonomous working device. Sometimes the autonomous working device is referenced as a service robot.

Autonomous working devices represent an increasing part of the general field of service robotics. Autonomous working devices, for example vacuum cleaner robots, window cleaning robots or autonomous lawnmowers are typically configured by assigning a working area and working parameters in an initial installation phase and after successfully terminating the installation phase, work almost entirely autonomous and independent from persons in the assigned working area.

Nevertheless, a situation may occur when the autonomous working device and a person are operating close to each other in the working area. For example, an autonomous lawnmower may perform its mowing task on a lawn area in a garden, while at the same time a gardener is attending specific sectors of the garden, for example a flowerbed. The gardener will feel annoyed or even molested by the autonomous lawnmower repeatedly again and again bumping into his back while he focuses on the flowerbed. Additionally, the gardener might recognize that the autonomous lawnmower while performing its mowing task and traveling on his navigation trajectory in a randomized manner through the working area, neglects a certain spot of the lawn area. However, the gardener might not have access to, or have not immediately at hand a smartphone or a tablet computer running an app for reprogramming the autonomous lawnmower. The gardener may also be reluctant to manipulate with fingers dirty from soil from the flowerbed, or under continuing rain, the tablet computer for reconfigure the working area or the navigation path of the autonomous lawnmower.

Taking these considerations into account, there exists a need for improving means to interact and communicate with the autonomous lawnmower for rearranging its navigation trajectory in order to mow the neglected spot on the lawn, or to excise an area around the flower bed from the working area in order to avoid continuing disturbances of the human gardener.

SUMMARY

The autonomous working device according to a first aspect, the method for controlling the autonomous working device according to a second aspect, and the non-transitory computer readable medium for controlling the autonomous working device according to a third aspect address these issues.

The autonomous working device according to a first aspect comprises at least one sensor configured to generate a sensor signal based on a physical interaction of the autonomous working device with a physical entity. The autonomous working device further includes at least one actuator configured to perform a working task, and a controller configured to generate a control signal for controlling the actuator. The controller is configured to evaluate the sensor signal, to determine a pattern of a physical interaction of the autonomous working device with a person based on the evaluated sensor signal and to generate the control signal based on the determined pattern of the physical interaction.

The method for controlling the autonomous working device according to a second aspect 3o refers to the autonomous working device comprising at least one sensor, at least one actuator for performing a working task, and a controller. The method comprises a step of generating, by the at least one sensor, a sensor signal based on a physical interaction of the autonomous working device with a physical entity. In a subsequent step, the controller evaluates the sensor signal. The controller generates a control signal based on the evaluated sensor signal. The actuator performs the working task based on the generated control signal. The method comprises a step of determining based on the evaluated sensor signal whether a pattern of a physical interaction of the autonomous working device with a person occurred. In case the controller determines that the pattern of a physical interaction of the autonomous working device with a person occurred, the controller performs a step of generating the control signal based on the evaluated sensor signal. The actuator then performs the working task based on the generated control signal.

The non-transitory computer readable medium for controlling the autonomous working device according to a third aspect stores a program with program-code for executing the steps of the method according to the second aspect, when the program is executed on a computer or digital signal processor.

BRIEF DESCRIPTION OF THE DRAWINGS

In the figures, same reference signs denote same or corresponding elements. A repetitive discussion of elements with same reference signs in different figures is avoided to improve conciseness where considered appropriate.

DETAILED DESCRIPTION

Figure 1:
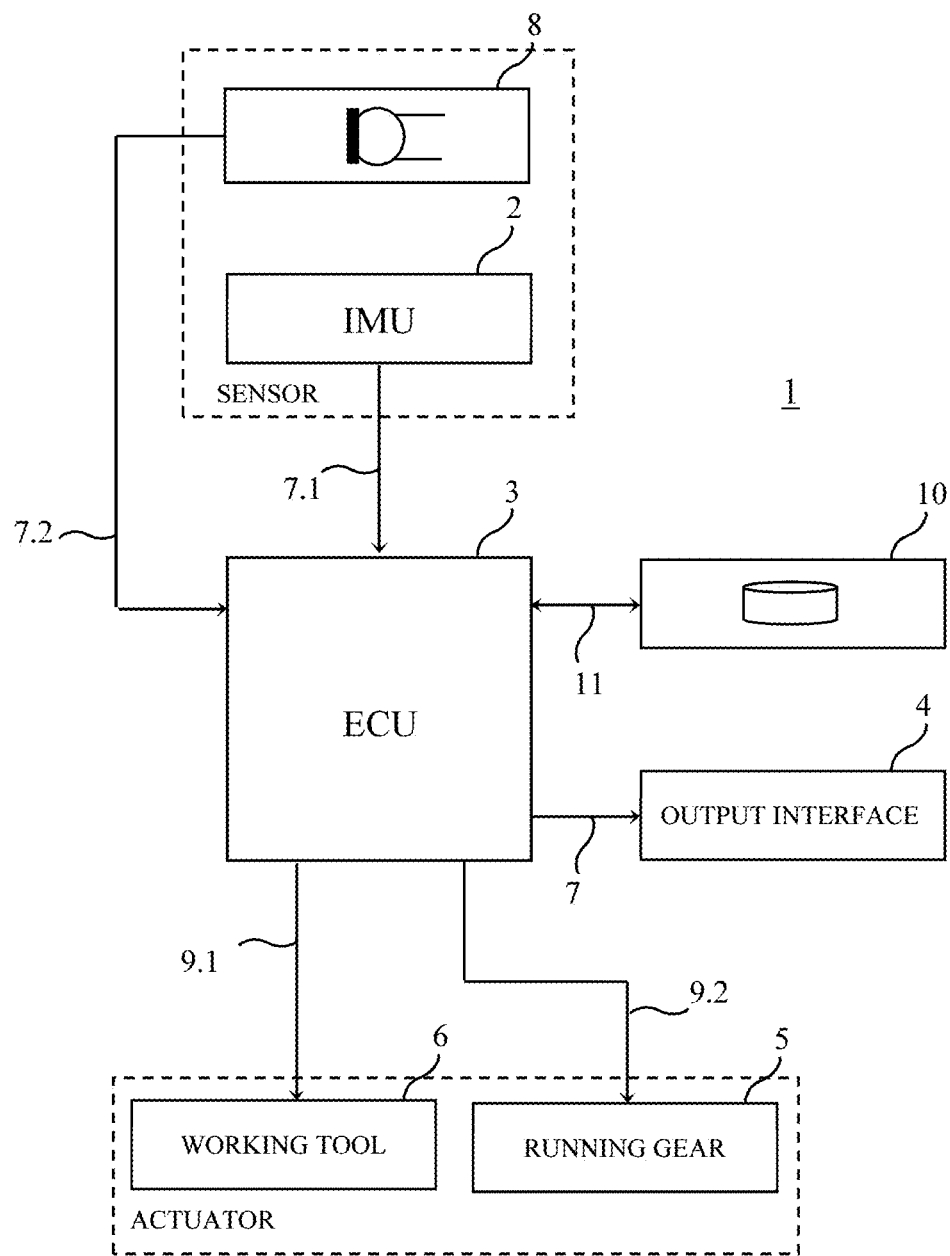
FIG. 1 provides an overview over a functional structure of an autonomous working device.

The autonomous working device according to the first aspect accordingly provides a natural human machine interface (HMI) by implementing an interaction method that allows for transferring of work-related information from a user to the autonomous working device. This transfer of information is implemented by using a low-cost sensor of limited quality already present in many of these current autonomous working devices. Thus, the autonomous working device may operate in a same working area where the person is the roaming, while the person is able to use intuitive gestures basing on the physical interaction with the autonomous working device to negotiate important aspects of a collaboration between the autonomous working device, on the one hand, and the person on the other hand. This negotiation is enabled by the autonomous working device understanding direct and intuitive input from the person, which enables the person $3o$ to provide the autonomous working device with simple commands or guidance. State-of-the-art autonomous working devices either ignore such commands and guidance, e.g. collide with the person at a low speed, or rely on manipulating buttons arranged on an outside of the autonomous working device, which may, for example, be difficult to operate and often just completely switch the autonomous working device into a standby mode or stop mode. State-of-the-art autonomous working devices only provide the capability of using a smartphone app, which has consequentially to be installed on the person's phone or tablet computer, which is time-consuming to open and operate. Speech interfaces, although offering an HMI suitable for intuitive operation, suffer from poor recognition quality of spoken commands in noisy environments, for example outdoor scenarios, and in particular, suffer from low-quality microphones characteristic and bad recognition rates due to limited processing resources for low-cost robot devices.

A physical interaction is a physical gesture performed by a person which involves a physical contact between the person, for example using at least a hand, or a foot or a finger and the autonomous working device. A gesture refers to intended physical contact between a human (person) and the autonomous working device, characteristically initiated by the human for an intended goal of communicating an information to the autonomous working device.

A significant advantage of the autonomous working device is using physical interactions and gestures to obtain commands. The physical gesture may be provided by the person interacting with the autonomous lawnmower without bowing down and possibly even without using hands. Both hands may be occupied, or disabilities may prevent a person to use its hands altogether.

The autonomous working device according to the first aspect enables, for example via a nudging gesture, to implement an intuitive process to change the autonomous working devices navigation trajectory, which is even easy to accomplish for a person without knowledge of the autonomous working devices specific functions, like a guest or a gardener/worker on the premises were the autonomous working device is operating. Such nudging gesture would even be easy to remember and does not require to bend down to the autonomous working device with its characteristically low profile, or to have two free hands for manipulating the robot. A physical interaction may even involve a foot of the person for performing the physical interaction with the autonomous working device.

The autonomous working device according an advantageous embodiment comprises the at least one sensor configured to generate the sensor signal while the autonomous working device is operating in a mode different from a programming mode or learning mode. The autonomous working device is therefore able to receive commands or guidance during performing its regular working task. A time consuming and burdensome re-programming after entering a programming or learning mode is therefore dispensable. Even persons such as supporting gardeners or workers not familiar or not authorized to program the autonomous working device may collaborate with the autonomous working device in the working area.

The autonomous working device may include the at least one sensor configured to generate the sensor signal, which measures an acceleration in at least one spatial direction.

Additionally or alternatively, the at least one sensor includes an inertial measurement unit (IMU). Acceleration sensors, already present on most current autonomous working devices, are common in form of an IMU measuring accelerations in up to three axes. Furthermore, IMUs are able to measure angular velocity around up to three axes. No additional hardware and corresponding cost are required for implementing the invention compared to existing autonomous working devices.

Additionally or alternatively, the at least one sensor includes a movable or force-sensitive cover of the autonomous working device.

Additionally or alternatively, the at least one sensor includes a touch-sensitive area arranged on the autonomous working device.

Sensors measuring forces exerted at least on parts of the housing of the autonomous working device are often already present for detecting collision events involving the autonomous working device and objects in the working area. No additional hardware and corresponding cost are required for implementing the invention compared to existing autonomous working devices.

Additionally or alternatively, the at least one sensor includes an acoustic sensor, in particular one or more microphones, configured to detect a knocking gesture.

Knocking patterns, be it a spatial pattern or time pattern or a combination thereof, offer the possibility to encode a plurality of different pieces of information in a manner easy to receive and decode by a machine even in case the machine comprises only low-cost sensors of a limited quality.

Additionally or alternatively, the at least one sensor includes a member arranged externally accessible on the autonomous working device. A member such as a stick protruding from an upper housing of the autonomous device, may offer an easy to recognize and simple to operate sensor for physically interacting with the autonomous working device.

According to an embodiment, the autonomous working device has at least one physical interaction including a push (nudging gesture, stroking gesture) of the autonomous working device into one direction. Pushing, nudging or stroking represent intuitive gestures involving physical interaction to convey a directional information from the person to the autonomous device, which at a same time are easy to detect and to evaluate in the autonomous device without requiring a complex sensor suite in addition to already present sensors measuring an acceleration, preferably in a plurality of acceleration axes.

Additionally or alternatively, the at least one physical interaction includes a touching gesture on the housing pushing the autonomous working device into one direction. Using the housing as sensitive area provides a robust and easily accessible HMI for persons, particularly in an outdoor environment involving dust, humidity and human persons with all hands engaged.

Additionally or alternatively, the at least one physical interaction includes a touching gesture into at least one direction (pet gesture) on the housing of the autonomous working device.

Additionally or alternatively, the at least one physical interaction includes a knocking pattern on the housing of the autonomous working device. Knocking patterns, e. g. spatial- and/or time-dependent patterns enable encoding a plurality of different pieces of information with advantageous transmission and decoding characteristics.

Additionally or alternatively, the at least one physical interaction includes a lifting of the autonomous working device. Entirely or partially lifting the autonomous working device is particularly simple and reliably to determine and thus to differentiate from usual accelerations encountered during normal operations of the autonomous working device.

Additionally or alternatively, the at least one physical interaction includes shaking of the autonomous working device.

Preferably, the autonomous working device may include the controller configured to generate the control signal including data on at least one working parameter based on the interpreted physical interaction. The at least one working parameter may comprise data defining a working area, in which the autonomous working device performs the working task.

Additionally or alternatively, the at least one working parameter may comprise data on a navigation trajectory of the autonomous working device in the work area.

Additionally or alternatively, the at least one working parameter may comprise data on an operation mode of the autonomous working device.

The person may thus provide specific information related to the actual working task currently performed by the autonomous working device using the physical interaction, without having to enter a burdensome programming mode for re-programming the autonomous working device.

According to an advantageous embodiment, the data defining the working area includes information on at least one of amending the working area, indicating a new working area, and defining an inhibited area in the working area.

Redefining a current working area of the autonomous working device offers the person collaborating with the working device in the same area with an advantageous capability to avoid possible interferences between human and machine and optimizes the task performance of both person and autonomous working device.

The data on the navigation trajectory may include information on at least one of amending (redirecting) the navigation trajectory, directing the autonomous device to a particular location, indicating a new navigation trajectory, and turning away from a current navigation trajectory. Thus, the person may use the physical interaction to point the working device towards a neglected area or an area requiring particular attendance in the working area.

The data on the operation mode may include information on at least one of a working mode, a pausing mode, a standby mode, a specific predefined working task, a specific predefined behavior, a surveillance mode, a tracing mode for the autonomous working device following a user, a storing mode for storing location and/or situation data into a memory, an unlocking process, a programming mode and a training mode. This embodiment offers the person with the option to switch between different operational modes without in-depth knowledge of specific HMI associated with the autonomous working device in a particularly intuitive manner.

The controller may be configured to select or amend the data on the at least one working parameter based on the evaluated sensor signal. A simple physical interaction of the person with the autonomous working device enables to amend or adjust the at least one working parameter in order to improve collaboration of autonomous working device and person in the working environment.

The controller of the autonomous working device of an advantageous embodiment is configured to select or amend at least one working parameter based on an evaluated further sensor signal obtained via a second sensor, in case the controller determines based on the evaluated sensor signal generated by a first sensor that a physical interaction of the autonomous working device with a person occurred. The person may therefore use the intuitive physical interaction detected by the first sensor to initiate a more complex communication conveying more information to the autonomous working device via the second senor of the autonomous working device.

The autonomous working device according to a further embodiment comprises an output interface. The controller is configured to generate and to output a feedback signal via the output interface to the person. The feedback signal communicates the evaluated sensor signal generated based on the physical interaction to the person. Thus, the autonomous working device can acknowledge a message conveyed via the physical interaction from the person, provide its interpretation of this message or guidance provided by the person suing the physical interaction. The person may accordingly correct a misinterpretation of the message by repeating or suitably adapting the physical interaction. The probability of a successful communication of information to the autonomous working device is significantly enhanced by the possibility of feedback signals, without reverting to a less intuitive HMI between the person and the autonomous working device.

The actuator of the autonomous working device according to a preferred embodiment includes at least one working tool and/or a running gear. The working tool of the autonomous working device may in particular be in particular a cleaning tool, a vacuum cleaning tool, an ironing tool, a mowing tool, a maintenance tool.

In a further advantageous embodiment, the autonomous working device includes the controller configured to determine a first pattern of a physical interaction based on the evaluated sensor signal generated based on a first physical interaction as a reward, and to determine a second pattern of a physical interaction based on the evaluated sensor signal generated based on a second physical interaction as a punishment. The controller may then adapt a future behavior of the autonomous working device based on the determined first pattern and second pattern, in particular by using a training algorithm.

Using the physical interactions and gestures for training the autonomous working device is advantageous, as, similar to training a pet, some gestures could be regarded as a rewarding gesture and another gesture as punishing gesture. Thus, the autonomous working device may learn to adapt its future behavior to the preferences of the person communicating with the physical interactions with the autonomous working device. For example, the autonomous working device could recognize that a certain part of the garden should not be entered at a certain time of a day or week. In order to do so the autonomous working device might store location and time information together with the physical gestures it recognized for later learning from them. For example, when waiting in the base station, the autonomous working device may process the learning algorithms based on the stored information and associated physical gestures, which are computationally demanding. This distribution of processing is advantageous, since the autonomous working device has no duty of currently performing the assigned working task, probably it only may need to charge its batteries. The learning could also have different levels. A first level of learning may be one-time (or one-shot) learning, e.g. for teaching the autonomous working device not to go close to a water area such as a pond or pool, which might damage the autonomous working device. Another level of learning would include a teaching of permanent rules, e.g. for forbidding nocturnal operation. And yet a further level of learning concerns a gradual reinforcement learning that constantly adapts rules the autonomous working device bases its operation on to the implicit rules that the person has in mind.

FIG. 1 provides an overview over a functional structure of an autonomous working device. The autonomous working device may be an autonomous lawnmower 1, but is not limited to the autonomous lawnmower 1. Alternatively, the autonomous working device may be an autonomous vacuum cleaning device, an autonomous floor cleaning device or an autonomous window cleaning device, for example. The autonomous working device or robot (robot device) may perform different working tasks in a working environment. Typically, the autonomous working device 3o executes the working task in a working area assigned to the autonomous working device. The working area may be separated and defined by a virtual or physical border from the non-working area in the environment of the autonomous working device.

The autonomous working device performs its working task using actuators which are controlled by a controller 3 of the autonomous working device using control signals 9.1, 9.2 generated and outputted to the actuators by the controller 3.

The controller 3 (electronic control unit, abbreviated ECU) usually includes at least one processor, in particular a microprocessor, or a signal processor and may store data such as program files, and data generated during operation of the autonomous working device in a memory 10. The memory 10 may include different types of memories such as read only memories (ROM), random access memories (RAM), flash drives, and disk drives, and may also include remote storage means arranged separate from the autonomous working device.

A remote storage means may be accessed via a communication link, preferably a wireless communication link using a communication signal 11 to a remote server. The remote storage means may in particular store data such as log data files.

The autonomous working device may include an output interface 4 for outputting either visually via a display or lighting means such as LED's, or acoustically via loudspeaker, information to a person in the environment of the autonomous working device. The controller 3 generates the information for outputting and generates an output control signal 7 for controlling output of the information by the output interface 4.

The autonomous working device may comprises different types of actuators. The actuators may include a working tool 6, which the controller 3 controls with a first control signal 9.1. The working tool 6 may include a mowing assembly in case of an autonomous lawnmower 1. The working tool 6 is the actuator component, which executes the working task.

The actuators of the autonomous working device include a running gear 5, which the controller 3 controls with a second control signal 9.2. The running gear 5 may include one or more motors, typically electric motors, a drive train, wheels and/or tracks, a steering assembly for changing a heading direction of the autonomous working device while moving.

The running gear 5 is the actuator component, which enables the autonomous working device to move around the working area and to perform the working task over the entire working area.

The controller 3 performs navigation tasks, and in particular generating the second control signals 9.2 to navigate the autonomous working device on a navigation trajectory (navigation path) based on sensor signals 7.1, 7.2. The autonomous working device shown in FIG. 1 includes two sensors, which generate the sensor signals 7.1, 7.2 based on measuring physical parameters of the environment of the autonomous working device.

The inertial measurement unit 2 (IMU) may include three basic acceleration sensors and determines acceleration of the autonomous working device in three independent spatial axes and provides the measured acceleration values in a first sensor signal 7.1 to the controller 3. The IMU 2 is a common sensor, which equips most autonomous working devices in order to enable the autonomous working device to navigate on its navigation trajectory trough the working area. The IMU 2 may be used as a linear and/or rotational acceleration sensor, typically including one or more accelerometers and gyroscopes.

Further, sensors may include an acoustic sensor 8 (microphone) which provides the acoustic input in a second sensor signal 7.2 to the controller 3. The sensors may include other sensors such as one or more camera sensors, a global navigation satellite system receiver (GNSS receiver), dedicated bump sensors for detecting collisions with objects in the working area, radar sensors or acoustic sensors for detecting physical objects in the environment. The sensors generate sensor signals 7.1, 7.2 and provide the generated sensor signals 7.1, 7.2 to the controller 3.

For sensing physical interactions of the autonomous working device with physical objects or persons, the autonomous working device uses preferably simple and common sensors already built into the autonomous working device for different purposes. This reduces complexity, and therefore cost, and only requires additional signal processing in the controller 3 of the autonomous working device.

The IMU 2 measures accelerations and provides information on forces on the autonomous working device causing the accelerations. Strength and direction of the forces measured by the IMU 2 can be used by the controller 3 running suitable processing with the sensor signal 7.1 as input to distinguish between collision events on the one hand and physical interactions such as pushing gestures on the other hand. The sensor signal 7.1 also provides suitable input to the controller 3 to be used to identify a shaking gesture or a lifting gesture.

The shaking gesture includes a shaking of the autonomous working device caused by a person. The lifting gesture refers to the person grasping the autonomous working device and lifting it from the ground.

A known autonomous lawnmower 1 comprise separate collision sensors, for example bump sensors or hall sensors that detect a relative movement between an outer cover of the autonomous lawnmower 1 and an inner main body of the autonomous lawnmower 1. This can be used to improve the distinction between a collision event and a pushing gesture. If, for example, the outer cover comprises a magnetic member and the inner main body arranges a hall sensor suitably in relation to the magnetic member, the sensor signal provided by the hall sensor may provide corresponding information on collision events and pushing gestures as the sensor signal from acceleration sensors, e.g. IMU 2.

The acoustic sensor 8 is not yet that common in the area of autonomous working devices and in particular in the autonomous lawnmower 1. The increasing trend towards speech recognition as input means may change that in future. Voice commands are language-specific, require more processing power for interpreting the acoustic raw data, are often less intuitive, and need to be distinguished from normal talk in the environment of the autonomous working device and a potentially noisy environment, particularly when regarding an autonomous lawnmower 1. The acoustic sensor 8 enables to identify knocking gestures and stroking gestures from its sensor signal 7.2. Knocking gestures and stroking gestures generate distinct sound patters, which the controller 3 may distinguish from speech or general environment noise by executing a suitable processing.

In an embodiment, the autonomous lawnmower 1 may arrange an acoustic sensor 8, for example built into the outer cover of the autonomous lawnmower 1, for a robust and low-cost detection of certain gestures as physical interactions.

Alternatively or additionally, the autonomous lawnmower 1 may comprise a touch sensitive area as a sensor, for example on its outer cover or body. A touch sensitive area may be a component of a touch interface and represent a natural and intuitive means of communication for persons used to related interfaces on smart devices like wireless phones and tablet computers. The touch interface enables inputting a plurality of commands that can even be configured by its user. A capacitive touch sensitive area is advantageous, because it reduces unintended gestures triggered by a normal physical interaction with the environment, e.g. low-hanging twigs in a garden environment.

Alternatively or additionally, the controller 3 is configured to implement a robust human robot interaction by combining a physical interaction with a person based on physical gestures with at least one additional sensor input, e.g. sound recognition, speech recognition, and visually detecting pointing gestures using a camera sensor.

A first gesture may temporarily stop movement of the autonomous lawnmower 1 along its navigation trajectory. This results in reduced noise due to suppressing movement induced noise and improves results of a subsequently performed speech recognition.

Alternatively or additionally, the controller 3 processes sensor signals 7.1, 7.2 providing visual, acoustic and/or other sensor input only after detecting a physical gesture. This approach results in a reduced computational load on the controller 3. A power consumption of the autonomous lawnmower 1 may be reduced, which is particular advantageous for autonomous working devices operating from rechargeable batteries. Furthermore, a likelihood of false positive command recognition, e.g. a false interpretation of noise as a voice command, may be avoided.

Figure 2:
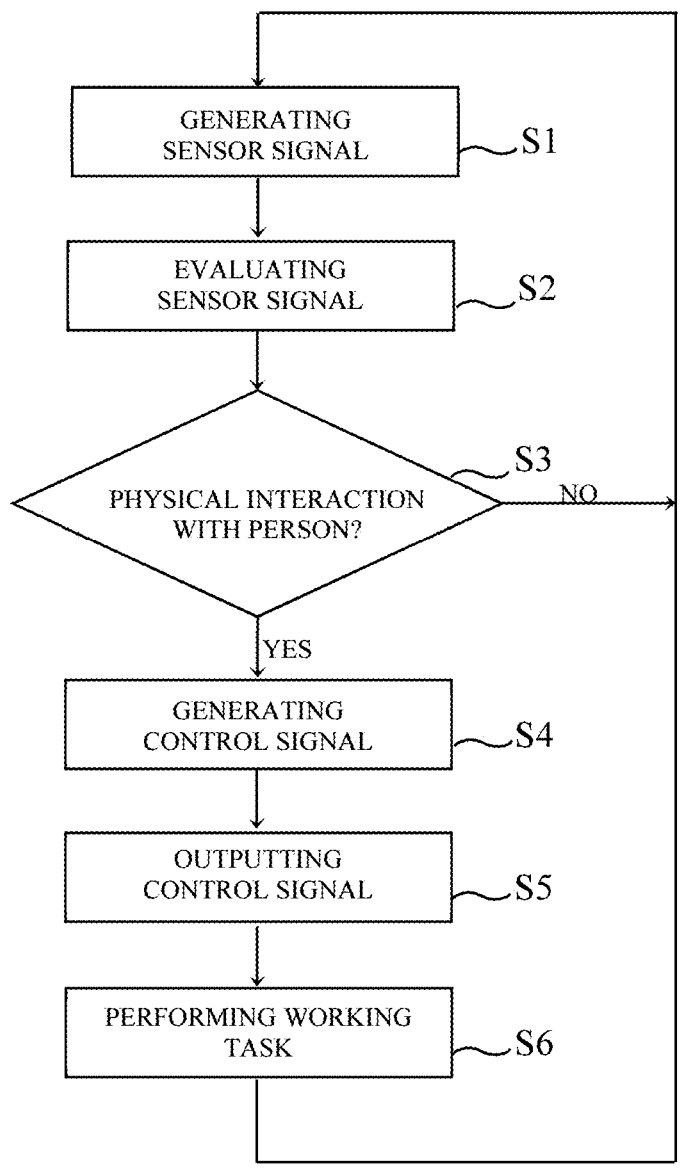
FIG. 2 shows a simplified flowchart of a method for controlling an autonomous working device according to an embodiment.

FIG. 2 presents a simplified flowchart of a method for controlling an autonomous working device according to an embodiment.

The method for controlling an autonomous working lawnmower 1 includes a step S1, in which the at least one sensor generates the sensor signal 7.1 based on a physical interaction of the autonomous lawnmower 1 with a physical entity. In particular, the IMU 2 of the autonomous lawnmower 1 may generate the sensor signal 7.1 including time dependent acceleration measurements of the autonomous lawnmower 1 in step S1.

The sensor provides the generated sensor signal 7.1 to the controller 3.

The controller 3 evaluates in step S2 the obtained sensor signal 7.1. In step S3, the controller 3 determines whether a physical interaction of the autonomous lawnmower 1 with a person occurred. In case the controller 3 determines from evaluating the sensor signal 7.1, that no physical interaction with a person is detected, the controller 3 returns to step S1 of generating the sensor signal 7.1.

In step S3, the controller 3 evaluates the sensor signal 7.1. Evaluating the sensor signal 7.1 may include interpreting the sensor signal 7.1. Evaluating the sensor signal 7.1 may include determining a predetermined type of physical gesture, for example a pushing gesture. Evaluating and interpreting the sensor signal 7.1 may further include evaluating the sensor signal 7.1 and computing a direction vector from the sensor signal 7.1 based on the evaluation. The controller may, for example compute the direction vector indicating a spatial direction into which the determined pushing gesture pushes the autonomous lawnmower from the sensor signal 7.1 provided by the IMU 2. Interpreting the sensor signal 7.1 may include associating the physical gesture with a particular control action of the autonomous lawnmower 1. For example, the determined pushing gesture may be associated with an action of the autonomous lawnmower 1 continuing performing its assigned task in the working area on an amended navigation trajectory. The amended navigation trajectory points into the direction indicated by the computed direction vector.

If the controller 3 determines in step S3 based on the obtained sensor signal 7.1 that a physical interaction of the autonomous lawnmower 1 with a person occurred, the controller proceeds to step S4.

In step S4, the controller 3 proceeds by generating the control signal 9.1, 9.2 based on the evaluated sensor signal 7.1. In an example, the controller 3 interpreted the sensor signal 7.1 as pushing gesture associated with an action of the autonomous lawnmower 1 continuing performing its assigned task in the working area on the amended navigation trajectory indicated by the computed direction vector. The generated control signal 9.2 will then include control data for the running gear 5 to change the course of the autonomous lawnmower 1 towards the direction indicated by the computed direction vector. The generated control signal 9.1, 9.2 for the working tool 6 may include data communicating an unchanged continuing of the autonomous lawnmower 1 in performing the unchanged working task of mowing grass on the new navigation trajectory.

The generated control signal includes information to the actuator to perform specific actions which result in the autonomous working device adapting its behavior based on the interpreted sensor signal 7.1, and therefore as communicated by the person U with the physical interaction.

The controller 3 outputs the generated control signal 9.1, 9.2 in step S5 to the actuator. In this example, the controller 3 outputs the generated control signal 9.2 including a new steering angle for the amended navigation trajectory indicated by the computed direction vector to the running gear 5.

The actuator performs in step S6 the working task based on the generated control signal 9.1, 9.2. In the example, the running gear 5 turns the autonomous lawnmower towards the amended direction indicated by the control signal 9.1 and proceeds on the new navigation trajectory.

Figure 3:
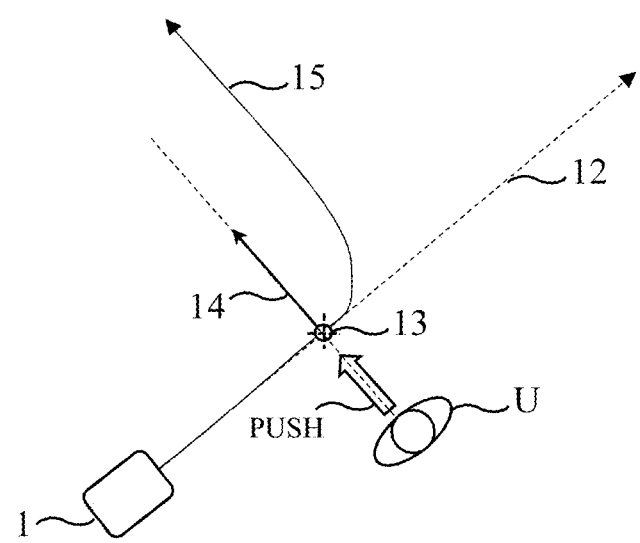
FIG. 3 shows a plan view of control of an autonomous working device according to an embodiment employing a push gesture.

FIG. 3 depicts a plan view of controlling an autonomous working device according to an embodiment employing a pushing gesture.

The autonomous working device in the depicted example is an autonomous lawnmower 1, which performs its mowing task moving on a planned navigation trajectory 12. While the autonomous lawnmower is at point 13 on a planned navigation trajectory 12, a person U performs a physical interaction with the autonomous lawnmower 1 in form of a pushing gesture. The person U performs the pushing gesture by pushing the autonomous lawnmower 1 into a direction indicated by the arrow "push".

The controller 3 interprets the sensor signal 7.1 as indicating a pushing gesture, the pushing gesture indicating an amended navigation trajectory 15, as well as the pushing gesture indicating the intended direction of the amended navigation trajectory 15. The controller evaluates the sensor signal 7.1 and computes a direction vector 14 indicating the intended direction of the amended navigation trajectory 15. The controller 3 then generates the control signal 9.2 and outputs the generated control signal 9.2 to the running gear 5 of the autonomous lawnmower 1. The running gear 5 changes course of the autonomous lawnmower 1 based on the control signal 9.2. The autonomous lawnmower 1 proceeds performing its mowing task after changing course on the amended navigation trajectory 15 pointing into the direction of the direction vector 14 indicating the intended direction.

The generated control signal 9.1, 9.2 includes information to the actuator to perform specific actions which result in the autonomous working device adapting its behavior based on the interpreted sensor signal, and therefore as communicated by the person U with the physical interaction.

For example, the autonomous working device may adapt the working area based on the physical interaction. In a typical application case, the autonomous working device operates in a certain area as its assigned working area that is intended to be used temporarily and exclusively by humans, animals, or objects which would be disturbed by the autonomous working device, e.g., a garden party in the back yard, or a board game on the floor. The physical gesture may be used to communicate to the autonomous working device that the working area, e.g., as predefined earlier, or a certain diameter around the current position of the autonomous working device shall not be working area, or again become work area, for a limited time period or permanently up to a new command.

The physical gesture may convey a wake up command or an unlock command. Autonomous working devices may use a secret PIN as a theft deterrent, which may be replaced by a certain physical gesture or a series of physical gestures, e.g., a knocking pattern as a shared secret between the autonomous working device and an authorized person, for example an owner of the autonomous working device.

The physical gesture may direct the autonomous working device towards a working area: Autonomous working devices often operate by random navigation within their working area, which may result in small remaining areas unattended, e.g., uncleaned or not mowed, for an extended time. Such remaining areas may cause frustration for a user. The user may now employ a physical gesture as a physical interaction to direct the autonomous working device in a direction of such a remaining area. Such direction could, for example, be encoded by the force direction of a pushing gesture, by an additional pointing gesture, by a voice command, or by the autonomous working device being ordered to temporarily follow the person to a location or area.

The physical gesture may indicate to the autonomous working device to go to parking position, or to charging position, e.g. at a base station, or to a different separate working area.

The physical gesture may indicate to the autonomous working device to take a break or to temporarily stop operation, e.g. for a predetermined time such as 1 h.

The physical gesture may indicate to the autonomous working device to change its current operation mode: the autonomous working device may be ordered to change its behavior to one of a set of predefined behaviors, e.g., mowing or cleaning, following the circumferential border of the working area for border cutting, or to switch to spiral cutting, or to go into a surveillance mode.

The physical gesture may indicate to the autonomous working device to temporarily deactivate performing its working task, e.g. a cutting/mowing operation, and to start an interactive play behavior instead.

The physical gesture may indicate to the autonomous working device to turn away: the autonomous working device is commanded to not continue on its current navigation trajectory. In case of a pushing gesture, the autonomous working device may interpret the pushing gesture preferably to turn away from a direction of the pushing force. A particular implementation induces a memoryless direct action of the autonomous working device immediately turning away in response to the pushing gesture.

Alternatively, the autonomous working device may interpret the pushing gesture as a learning signal to avoid similar situations in the future by automatically turning away. Such a situation may be based on a current location of the pushing gesture on the housing of the autonomous working device, or another sensor signal input, e.g., a slope angle, or a visual input for object detection.

The autonomous working device may interpret the pushing gesture as a command to remember something, using the storage capability of the memory 10. For example, the controller 3 may store a current location or parameters obtained via sensor signals 7.1, 7.2 defining a specific situation for later training of a corresponding behavior of the autonomous working device. Later training may involve the person using a smart device and referring to one or more stored specific situations for teaching or reinforcing a certain behavior of the autonomous working device.

The autonomous working device may interpret the pushing gesture as command to follow the person U to a new location within the working area or outside the working area.

The pushing gesture is a natural and intuitive means of giving the autonomous working device a directional command to change its current navigation trajectory 31 into the direction of the pushing gesture. The person U may do the pushing gesture by hand or by another extremity, e.g., when carrying something use its foot. Pushing gestures need to be distinguished from collision events by the autonomous working device that may happen more frequently, since most state-of-the-art autonomous working devices do not employ a remote sensor for obstacle avoidance like a sonar sensor or a camera. A pushing gesture is different from a collision event in three aspects. First, collision events often lead to a strong acceleration of the autonomous working device, while gentle pushes have a rather low acceleration. Second, collision events typically cause a peaked acceleration while gentle pushing gestures have a smooth profile, as will be discussed with respect to FIG. 5. Third, the collision event leads in particular to an acceleration in the opposite direction of the current movement direction while the pushing gesture is more likely to be directed sideways, thus in an angled direction deviating from the current movement direction. A particular variant of the pushing gesture is pushing from backwards of the body of the autonomous working device in a direction pointing towards a forward direction of the autonomous working device in order to indicate to the autonomous working device to move faster.

Furthermore, it is favorable to use pushing gestures such that occasionally wrongly interpreted (misclassified) collision events do not have a negative effect on future operation of the autonomous working device. For example, a frontal pushing gesture meaning "stop and turn away" will also be useful for a misclassified collision event with a stationary obstacle, whereas "stop and wait for further command" is less useful.

Figure 4:
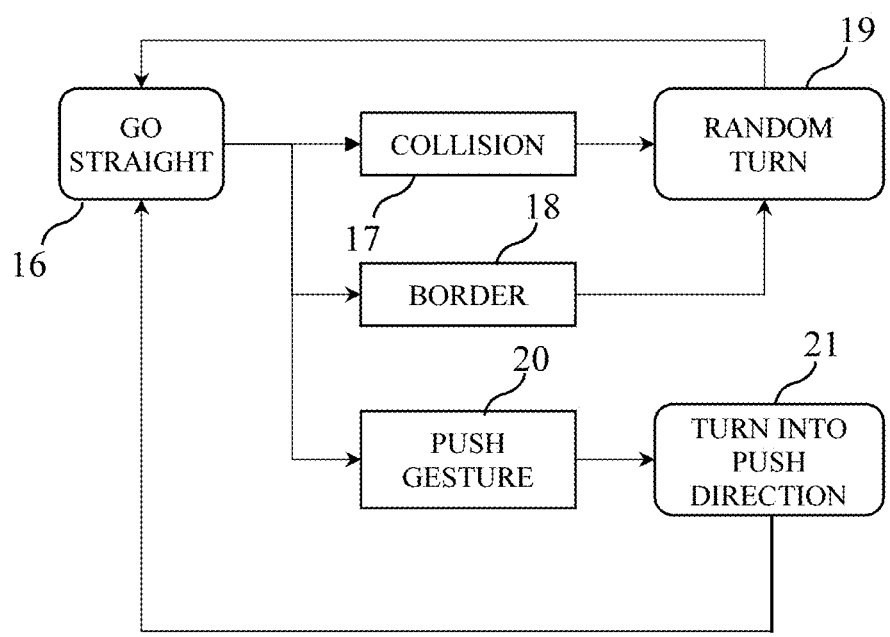
FIG. 4 presents a simplified state graph of operational states of an autonomous working device according to an embodiment.

FIG. 4 shows a simple state graph of operational states of an autonomous working device according to an embodiment.

The depicted operational states are operational states of the autonomous working device in a working operation mode. In particular, the depicted operational states refer to states of the running gear 5 of the autonomous working device.

The operational states in the working operation mode include a first state of the autonomous working device travelling on straight path in the travelling state 16.

The second state is a random turning state 19. In the random turning state 19, the autonomous working device changes its current heading direction into a new heading direction by a randomly chosen angle.

The autonomous working device may transition from the travelling state 16 to the random turning state 19, in case a collision detection event 17 is detected. A further transition event causing the autonomous working device to transition from the travelling state 16 to the random turning state 19 occurs in case the controller 3 determines that the autonomous working device arrives at a border of its allocated working area (border detection event 18).

The autonomous working device supplements the travelling state 16 and the random turning state 19 in the working operation mode by third state, which is a directional turning state 21. The autonomous working device transitions from the travelling state 16 to the directional turning state 21 in case the controller 3 determines a pushing gesture as a physical interaction (pushing gesture detection event 20). In the directional turning state 21, the controller 3 may compute a directional vector indicating a pushing direction of the determined pushing gesture, and amends the current navigation trajectory to a new navigation trajectory, which points towards the spatial direction into which the computed direction vector of the pushing gesture points. Having performed the turning onto the new navigation trajectory with the amended direction, the controller 3 controls transitioning of the autonomous working device into the first state, the travelling state 16.

It is apparent, the discussed states and state transitions in FIG. 4 are mere exemplary and a plurality of further states and state transitions may be defined in the working operation mode of the autonomous working device.

FIG. 4 demonstrates the enhanced features of the autonomous working device compared to the state-of-the-art. The state-of-the-art requires teaching the autonomous working device in a specific training mode or programming mode. The training mode may use a method sometimes referred to as "teach-in". The generally known "teach-in" process for the autonomous working device uses a physical interaction with the autonomous working device when undergoing training. However, the teach-in requires setting the autonomous working device into the training mode. In the training mode, the autonomous working device trains entire navigation trajectories, before switching into the operational mode and starting performing the working task. Contrary thereto, the method for controlling the autonomous working device of FIG. 2 provides an intuitive interaction capability with the autonomous working device while in the working operational mode during execution of the working task in order to adapt or change the current behavior. The change in behavior of the autonomous working device can be temporally limited, for example requiring the autonomous working device to turn away from its current heading direction, and then to resume standard operation, for example in the travelling state 16.

Figure 5:
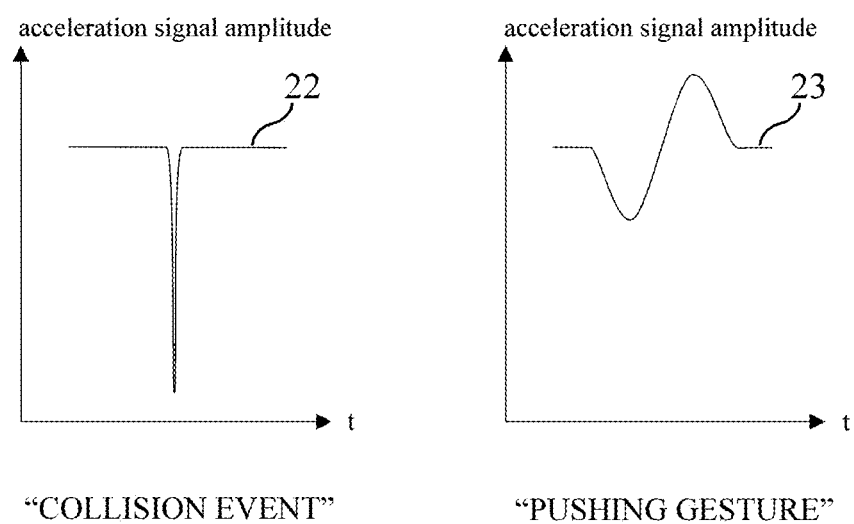
FIG. 5 displays examples for sensor signals for a collision event and a push gesture as physical interactions.

FIG. 5 provides basic examples for sensor signals for a collision event and a pushing gesture. The depicted sensor signals are acceleration sensor signals and are shown with their acceleration signal amplitude on the ordinate axis over the time t shown on the abscissa.

Acceleration sensor signal curve 22 shows a characteristic signal peak for a collision event.

Acceleration sensor signal curve 23 shows a characteristic signal curve for a pushing gesture.

When comparing acceleration sensor signal curve 22 with acceleration sensor signal curve 23, the different signal curves disclose the possibility to configure the controller 3 in order to distinguish between the collision event on the one hand and the pushing gesture on the other hand by evaluating the sensor signals provided by a sensor providing continuous acceleration measurements. Acceleration sensors or force sensors form part of the IMU 2 of many autonomous working devices.

Figure 6:
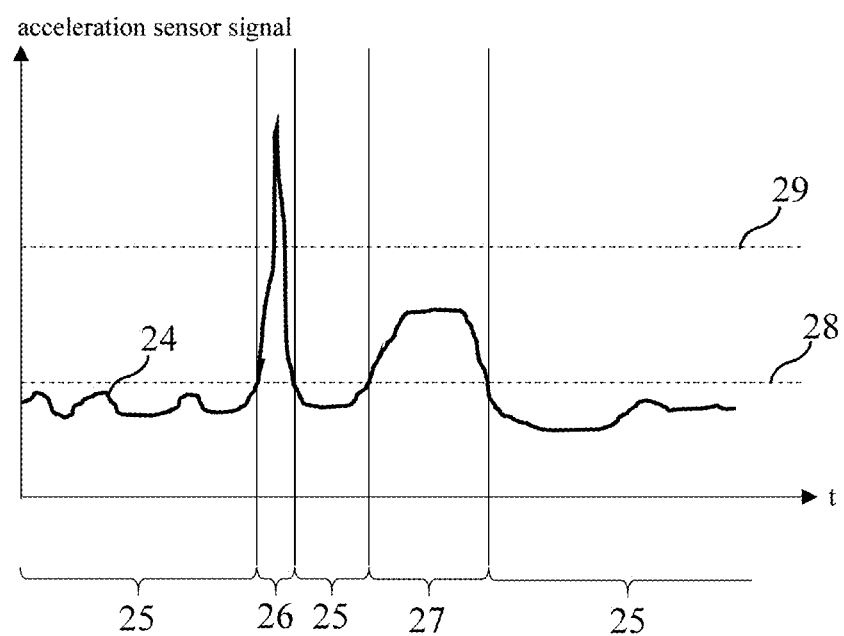
FIG. 6 displays an example for a sensor signal showing a collision event and a push gesture 3o and a discrimination filter for detecting gentle push gestures.

FIG. 6 displays an example for a sensor signal showing a collision event and a push gesture and a discrimination filter for detecting gentle push gestures.

State-of-the-art autonomous working devices such as the autonomous lawnmower 1 are able to detect a collision with a physical object by means of sensor signals provided by sensors, for example a hall sensor, dedicated bump sensors, or by monitoring a drive motor current. Most autonomous lawnmowers 1 comprise a built-in IMU 2. The IMU 2 may be used for distinguishing between a passive collision event between the autonomous lawnmower 1 and a physical object in the environment, on the one hand, and an active pushing gesture exerted by a person as form of a physical interaction on the other hand.

Collision events are characteristically very abrupt events and lead to a short peak in a sensor signal curve 24 outputted by a g-sensor forming part of the IMU 2 and providing acceleration force measurements. Contrary to the collision event, a gentle pushing gesture results in a flat signal increase, and long plateau in the sensor signal curve 24 outputted by the g-sensor.

FIG. 6 displays the sensor signal curve 24 provided by g-sensor over time t. The sensor signal curve 24 exhibits a noise component, which is the only signal component during the time periods 25. During a time period 26, the sensor signal curve 24 shows a characteristic collision event characterized by short peak in the sensor signal curve 24, with a characteristically steep rise and equally steep descent of the sensor signal curve 24. During a time period 27, the sensor signal curve 24 shows a characteristic pushing gesture event with a flat peak, a characteristic slower rise and equally slower descent of the sensor signal curve 24 when compared with the sensor signal curve 24 during the time period 26. A first maximum value of the sensor signal curve 24 during time period 26 depicting the collision event is larger than a second maximum value of the sensor signal curve 24 during time period 27 depicting the pushing gesture event.

Hence, the pushing gesture corresponding to gentle push by the person and the collision event corresponding to an abrupt collision with a physical object can be distinguished from the sensor signal force curve 24, for example, by using signal processing, in particular comparing the sensor signal curve 24 with one or more thresholds.

The IMU 2 may employ g-sensors in three spatial axes. An embodiment of the controller 3 implements a signal processing, which includes summing up the readings of the three-axes g-sensor in all three dimensions. Alternatively, the readings for each axis may be processed separately in the controller 3.

The controller 3 compares the sensor signal, preferably the summed sensor signal, with a first threshold 28. The first threshold 28 is used for filtering the noise component in the sensor signal. If the sensor signal surpasses the first threshold 65, the controller 3 determines that an event of a yet unspecified nature occurred.

The sensor signal curve 24 in FIG. 6 exceeds the first threshold 28 during the time period 26 and during the time period 27 again. Thus, the controller 3 determines an unspecified event having occurred during both the time period 26 and the time period 27 as well, based on the depicted sensor signal curve 24.

Controller 3 further compares the sensor signal with a second threshold 29. The second threshold 29 enables distinguishing between gentle events and abrupt events based on the sensor signal. If the sensor signal surpasses the second threshold 29, the controller 3 determines that an abrupt event occurred. The sensor signal needs to surpass the second threshold 29 for some minimum time in order to reliably detect the abrupt event, for example for a minimum time of 500 ms.

In a further advantageous embodiment, the autonomous lawnmower 1 uses additional sensor signals generated and outputted by additional sensors for detecting a collision event and distinguishing between collision events and pushing gestures. The additional sensors may include at least one of a hall sensor and a current sensor monitoring a drive motor current of an electric motor of the running gear of the autonomous lawnmower 1. The controller 3 may use these additional sensor signals in a signal processing achieving a more stable detection of collision events and differentiating between collision events and pushing gestures.

If the controller 3 detects an abrupt event, he will handle the detected abrupt event as a collision event. Given this case, the controller 3 will control the autonomous lawnmower 1 according to a standard collision behavior implemented by the autonomous lawnmower 1. The standard collision behavior may include a random turn of the autonomous lawnmower 1.

If the controller 3 detects a gentle pushing event, the controller 3 handles the gentle pushing event as a determined pushing gesture. The controller 3 may proceed by combining the sensor signal readings from the three axis of the IMU 2 to compute a direction, in particular a direction vector, of the pushing gesture. The controller 3 may interpret the determined pushing gesture as an indication provided by the person via a physical interaction to drive into the spatial direction defined by the computed direction vector. The controller 3 then generates and outputs a suitable control signal 9.2 to the actuator, in this case the running gear 5, in order to turn the autonomous lawnmower 1 into the direction indicated by the computed direction vector. The autonomous lawnmower 1 may then continue with a standard movement pattern performing its working task and starting its navigation trajectory into the direction indicated by the computed direction vector.

Additionally, the controller 3 may implement a processing, which, in case a predetermined number of pushing gesture events is detected within a predetermined time window, the controller 3 may interpret this sequence of pushing gesture events such that the autonomous lawnmower 1 might disturb a human at work. The controller 3 may then proceed by triggering the autonomous lawnmower 1 to return to its base station and pause there in pause mode for a certain time period in response to the detected sequence of pushing gesture events.

The predetermined number of pushing gesture events, the length of the predetermined time window, the certain time to wait in the base station may be configurable. Exemplary values include a predetermined number of three pushing gesture events within a time window of five minutes and a pause time of one hour.

Figure 7:
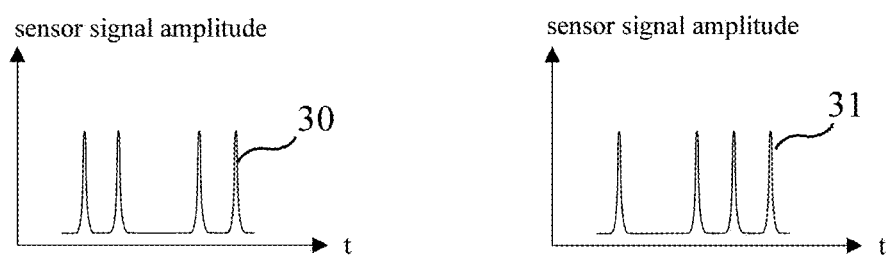
FIG. 7 shows two examples for sensor signals for knocking gestures with different knocking time patterns.

FIG. 7 shows two examples for sensor signals for knocking gestures with different knocking time patterns.

The knocking gestures may be detected by the controller 3 by using a sensor signal 7.2 generated and provided by one or more microphones 8. Each particular knocking pattern is characterized by a particular sensor signal curve 30, 31.

The sensor signal curve 30 shows a first knocking time pattern. The first knocking time pattern comprises two groups of knocks separated by a first time period, each group including two singular knocks separated by a second time period smaller than the first time period.

The sensor signal curve 31 shows a second knocking time pattern. The second knocking time pattern comprises a first knock separated by a first time period, from a group of knocks including three singular knocks separated by a second time period from each other, the second time period being smaller than the first time period.

The sensor signal curves 30, 31 use a time pattern to encode information to be communicated to the autonomous lawnmower 1.

Alternatively or additionally, a spatial knocking pattern may be employed. The spatial knocking pattern requires an arrangement and/or type of sensors, which enable the controller 3 to distinguish a spatially distinct knocking patterns, for example by using a sensor signal consisting of sensor signal components provided by plural touch sensitive surfaces arranged on the housing of the autonomous lawnmower 1.

A knocking gesture is a highly versatile gesture, as different knocking patterns enable to communicate commands from a predefined set of commands. The set of commands may be predefined and stored associated with corresponding knocking patterns in the memory 10. Alternatively or additionally, the set of commands may be customized by the user of the autonomous lawnmower 1.

A knocking gesture with a specific knocking pattern may be used as an alternative for a PIN for unlocking the autonomous lawnmower 1.

Preferably, the autonomous lawnmower 1 provides feedback in response to a detected knocking gesture with a determined knocking pattern to the user. The controller 3 may generate and output the feedback signal 7 to the output interface 4 based on the detected knocking gesture with the determined knocking pattern. The output interface 4 outputs information the detected knocking gesture with a determined knocking pattern to the user, The output interface 4 may provide output visually or acoustically, thereby enabling the user to understand what the autonomous lawnmower 1 detected, how the autonomous lawnmower 1 interpreted the detected knocking gesture. The user may adapt his knocking gesture accordingly, for example in case the autonomous lawnmower 1 misinterpreted the knocking gesture or the user intended another command.

Alternatively or additionally, the controller 3 and the sensor implement an input means, which in combination with the controller 3 and the output interface 4 implementing an output device for a human machine interface (HMI) presenting a menu structure to the person U displaying visually or acoustically menu items representing control options for the autonomous lawnmower 1. The person U may use the input means for selecting one of the presented control options in this particular embodiment.

Figure 8:
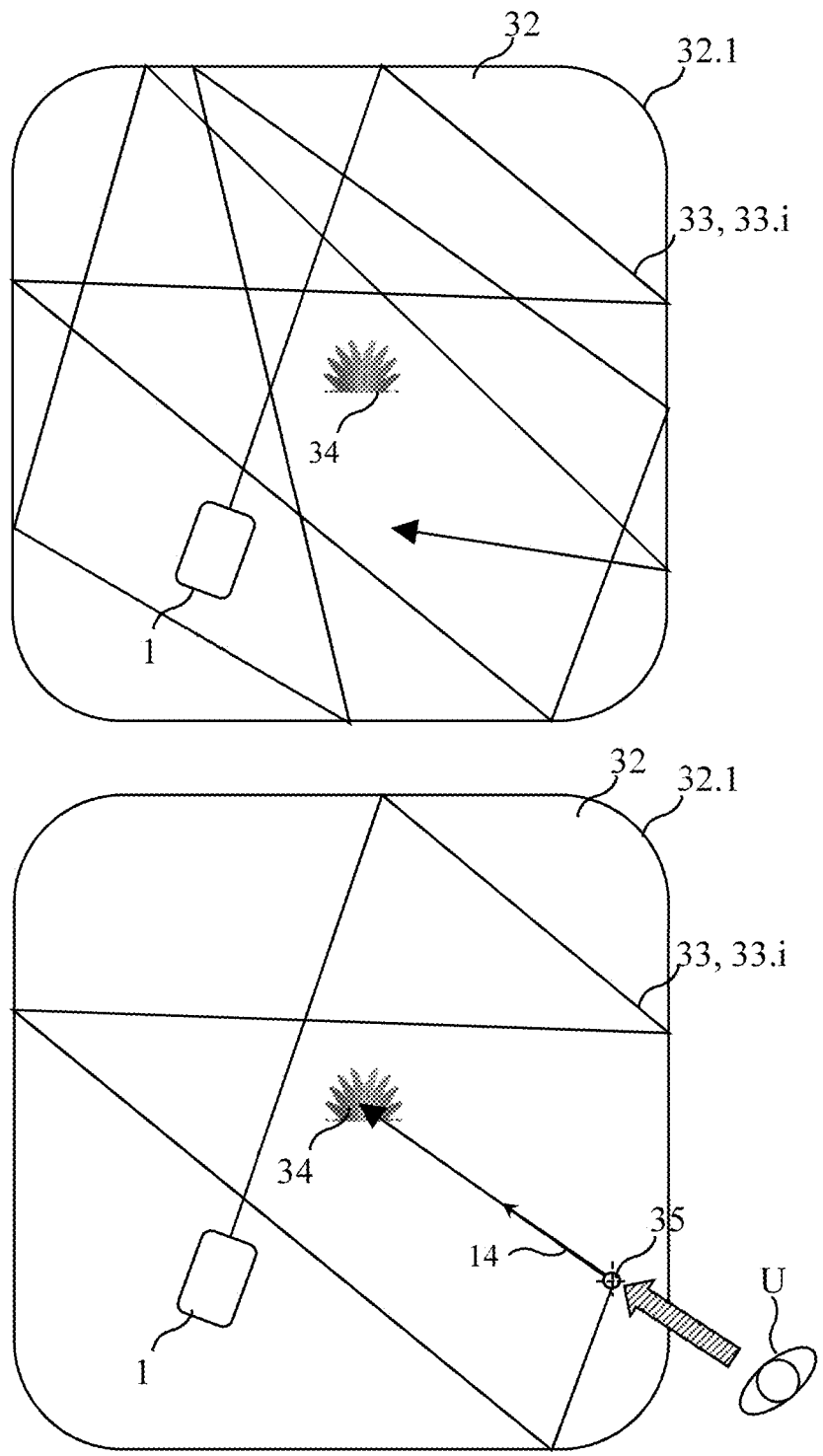
FIG. 8 depicts a first application scenario for an autonomous working device according to an embodiment.

FIG. 8 depicts a first application scenario for an autonomous working device, in particular an autonomous lawnmower 1 according to an embodiment.

The autonomous lawnmower 1 performs his mowing task while traveling on a navigation trajectory 33 in the working area 32. The navigation trajectory 33 consists of a sequence of straight path segments 33.$i$, $i=1, 2, 3, \ldots$.

Each time the autonomous lawnmower 1 traveling on a straight path segment along the navigation trajectory 33 arrives at the border 32.1 of the working area 32, the autonomous lawnmower 1 performs a turn and proceeds on a new straight path segment 33.$i$ within the working area 32. The change of the traveling direction performed by the autonomous lawnmower 1 during the turn executed when reaching the border 32.1 is randomly selected.

Nevertheless, as shown in the upper part of FIG. 8, this might result in a grass patch 34 not be being shortened for a long time.

The lower part of FIG. 8 demonstrates, that the person U may use a pushing gesture performed as a physical interaction with the autonomous lawnmower 1 to direct the navigation trajectory 33 of the autonomous lawnmower 1 towards the grass patch 34. In particular, the person U may perform the pushing gesture by pushing the autonomous lawnmower 1 at the current position 35 on its navigation trajectory 33 into a direction pointing from the current position 35 towards the grass patch 34. The controller 3 will, as explained when discussing FIGS. 2 and 3, determined that a physical interaction with a person has occurred, that the physical interaction is a pushing gesture, and compute the direction vector 14 of the determined pushing gesture. The controller 3 will proceed by generating a suitable control signal 9.2 in order to control the running gear 5 of the autonomous lawnmower 1 to proceed on an amended navigation trajectory 33 by continuing on the new path segment 33.$i$ guiding the autonomous lawnmower 1 directly towards the grass patch 34. Thus, the person U may ensure with a simple pushing gesture that the grass patch 34 is mowed as soon as possible, without having to enter a specific programming mode.

Figure 9:
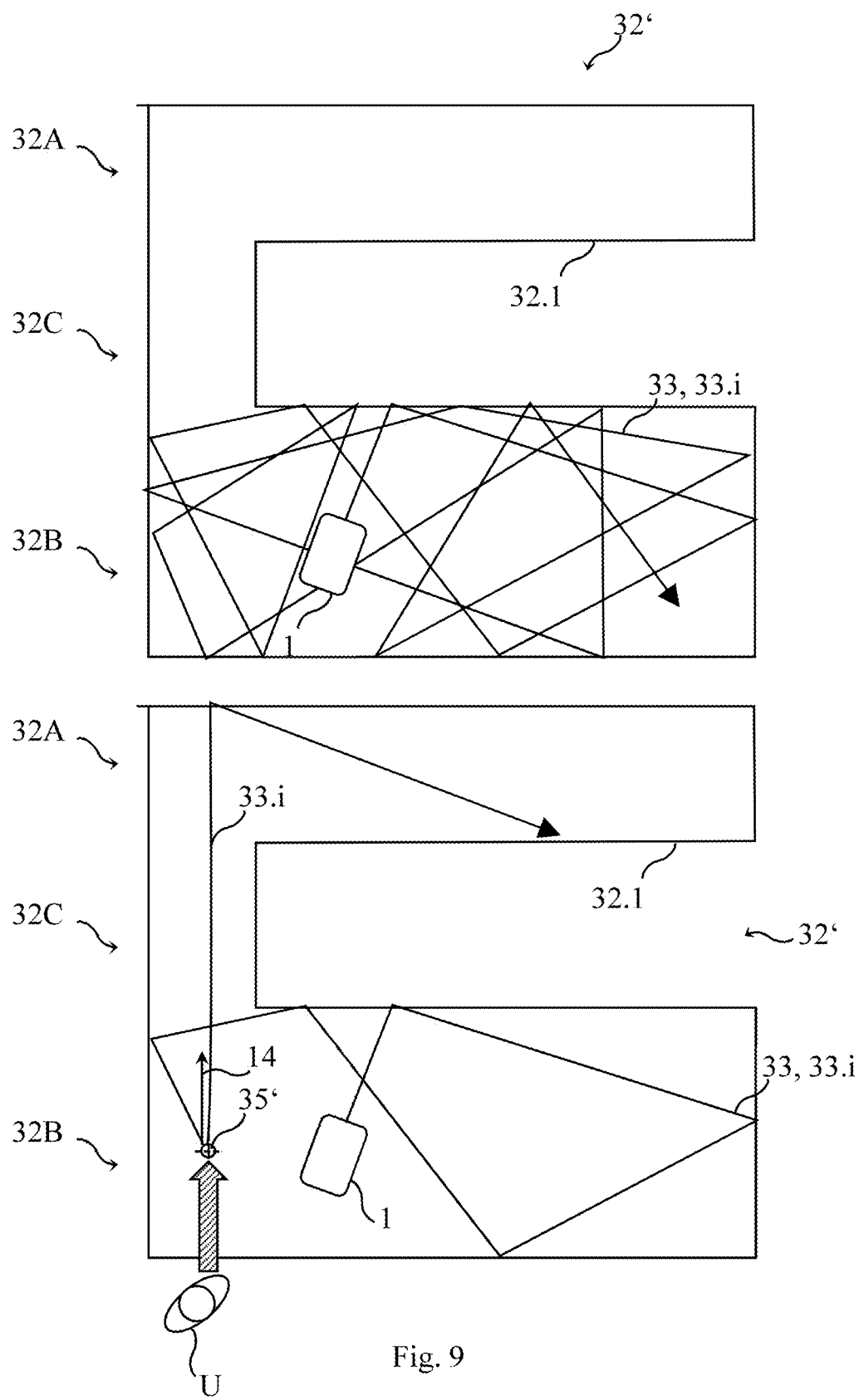
FIG. 9 depicts a second application scenario for an autonomous working device according to an embodiment.

FIG. 9 depicts a second application scenario for an autonomous working device, in particular an autonomous lawnmower 1 according to an embodiment.

The autonomous lawnmower 1 performs his mowing task while traveling on a navigation trajectory 33 in the working area 32'. The navigation trajectory 33 consists of a sequence of straight path segments 33.$i$, $i=1, 2, 3, \ldots$. The working area 32' depicted in FIG. 9 is of a different shape compared to the working area 32 shown in FIG. 8. In FIG. 9, the border 32.1 defines a working area consisting of first partial area 32A and a second partial area 32B, which are interconnected by a third partial area 32C in the form of a small rectangular corridor.

The upper part of FIG. 9 shows that the autonomous lawnmower 1 starting in the second partial area 32B will proceed performing his mowing task while traveling on the navigation trajectory 33 exclusively in the second area 32B. The autonomous lawnmower 1 will accordingly neglect first partial area 32A and the third partial area 32C.

The lower part of FIG. 9 shows how the person U uses a pushing gesture performed as a physical interaction with the autonomous lawnmower 1 to direct the navigation trajectory 33 of the autonomous lawnmower 1 at the current position 35' in the second partial area 32B towards the third partial area 32C. In particular, the person U performs the pushing gesture by pushing the 3*o* autonomous lawnmower 1 at the current position 35' on its navigation trajectory 33 into a direction pointing from the current position 35' towards the third partial area 32C. The controller 3 will, as explained when discussing FIGS. 2 and 3, determined that a physical interaction with a person has occurred, that the physical interaction is a pushing gesture, and compute the direction vector 14 of the determined pushing gesture. The controller 3 will proceed by generating a suitable control signal 9.2 in order to control the running gear 5 of the autonomous lawnmower 1 to proceed on an amended navigation trajectory 33 by continuing on the new path segment 33.$i$ guiding the autonomous lawnmower 1 directly towards third partial area 32C, through the third partial area 32C into the first partial area 32A. Thus the person U achieves by using a simple pushing gesture that the neglected third partial area 32C and first partial area 32A are also mowed.

Figure 10:
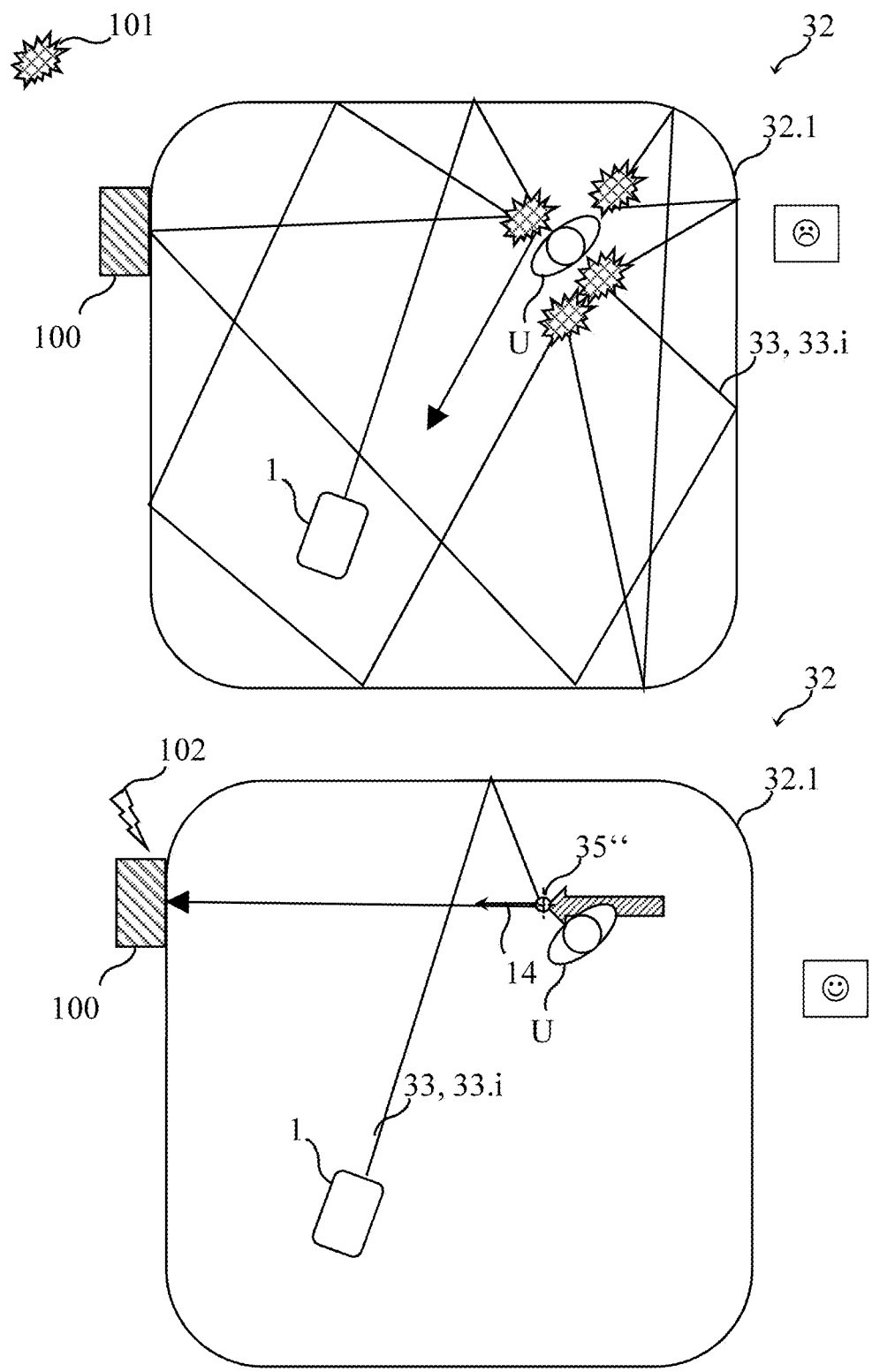
FIG. 10 depicts a third application scenario for an autonomous working device according to an embodiment.

FIG. 10 depicts a third application scenario for an autonomous working device, in particular an autonomous lawnmower 1 according to an embodiment.

The autonomous lawnmower 1 performs his mowing task while traveling on the navigation trajectory 33 in the working area 32. The navigation trajectory 33 consists of a sequence of straight path segments 33.$i$, $i=1, 2, 3, \ldots$. The person U is simultaneously working in the working area 32.

The upper part of FIG. 10 shows that the autonomous lawnmower 1 while proceeding on his navigation trajectory 33 performing his mowing task will repeatedly collide with the person U, thereby causing four collision events 101. These collision events might annoy or even endanger the person U.

The lower part of FIG. 10 shows how the person U uses a pushing gesture performed as a physical interaction with the autonomous lawnmower 1 to direct the navigation trajectory 33 of the autonomous lawnmower 1 at the current position 35" towards the base station 100 in order to signal that a free working area 32 is requested. In particular, the person U performs the pushing gesture by pushing the autonomous lawnmower 1 at its current position 35" on its navigation trajectory 33 into a direction pointing from the current position 35" towards the location of the base station 100. The controller 3 will, as explained when discussing FIGS. 2 and 3, determine that a physical interaction with a person has occurred, that the physical interaction is a pushing gesture, compute the direction vector 14 of the determined pushing gesture, determine that the direction vector 14 from the current position 35" points toward the base station 100. The controller 3 may interpret this specific pushing gesture as signaling that a free working area 32 is requested by the person U. The controller 3 will proceed by generating a suitable control signal 9.2 in order to control the running gear 5 of the autonomous lawnmower 1 to redirect the amended navigation trajectory 33 by continuing on the new path segment 33.i leading the autonomous lawnmower 1 directly towards the location of the base station 100. Additionally or alternatively, the autonomous lawnmower 1 and the base station 100 may use a communication link 102 established between the autonomous lawnmower 1 and the base station 100 for steering the autonomous lawnmower 1 to the base station 100. The autonomous lawnmower 1 may remain at the base station 100 in pause mode for a predetermined time period.

Alternatively, the controller 3 may interpret the determined pushing gesture towards the base station as defining an interdiction area of a predetermined shape and extending for a predetermined range around the current position 35". The autonomous lawnmower 1 may then avoid entering the interdiction area for a predetermined time period by controlling the running gear 5 by issuing control signals from the controller 3 accordingly.

Thus, the person U achieves by using a simple pushing gesture that the person U and the autonomous lawnmower 1 do not interfere with each other in the working area 32.

Figure 11:
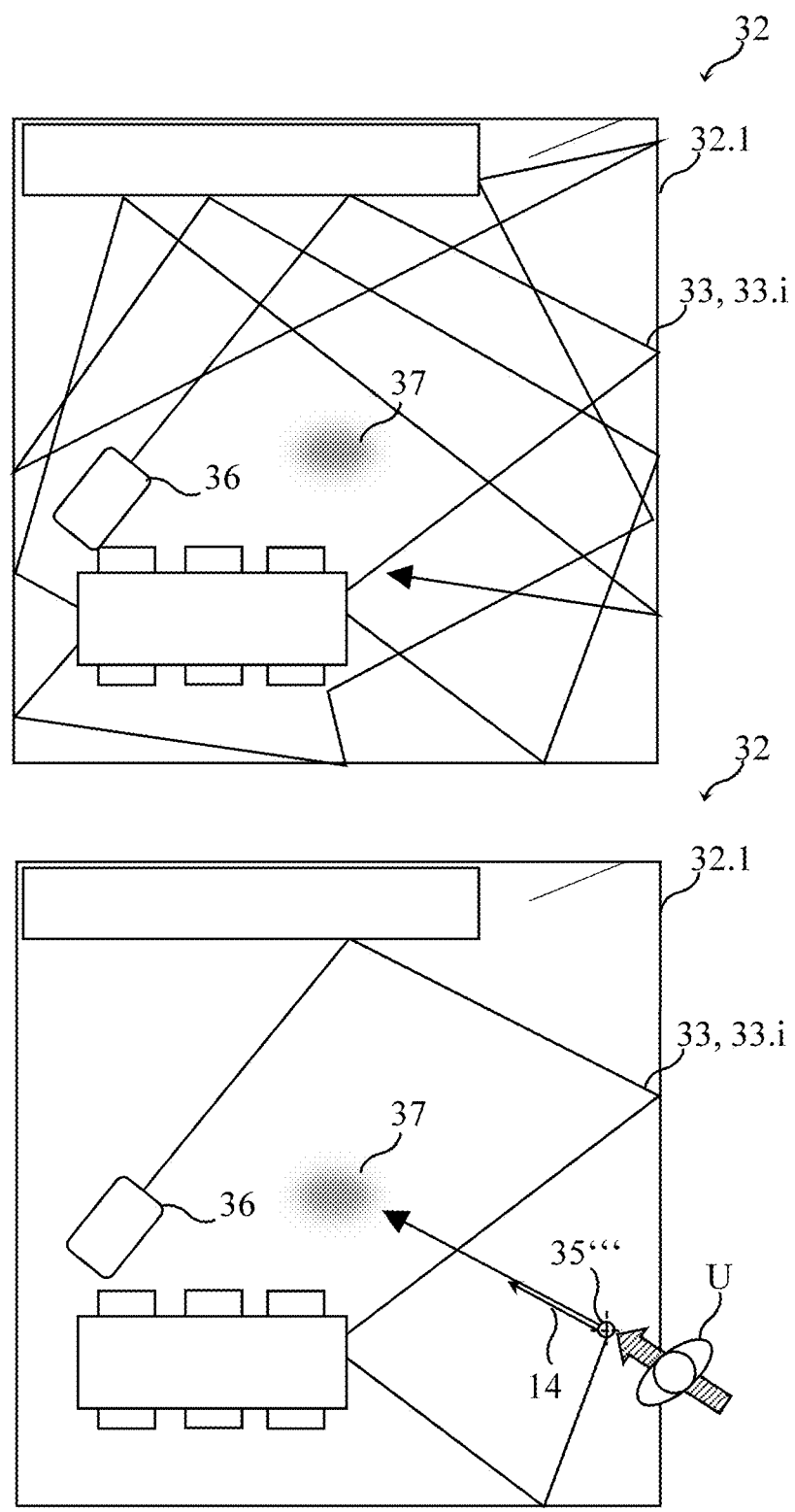
FIG. 11 depicts a fourth application scenario for an autonomous working device according to an embodiment.

FIG. 11 depicts a fourth application scenario for an autonomous working device, which is an autonomous vacuum cleaning device 36. The autonomous vacuum cleaning device 36 performs its cleaning task in a working area 32, which corresponds a room. The autonomous vacuum cleaning device 36 performs his cleaning task while traveling on the navigation trajectory 33 in the working area 32. The navigation trajectory 33 consists of a sequence of straight path segments 33.i, i=1, 2, 3, . . . . Performing the cleaning task is essentially performed by the autonomous vacuum cleaning device 36 in a corresponding manner as the autonomous lawnmower 1 performs its mowing task as discussed with respect to FIG. 8.

As shown in the upper part of FIG. 11, this might result in a patch 37 not be being cleaned for a long time. The patch 37 corresponds to the grass patch 34 in FIG. 8.

The lower part of FIG. 11 shows, that the person U may use the pushing gesture performed as a physical interaction with the autonomous vacuum cleaning device 36 to direct the navigation trajectory 33 of the autonomous vacuum cleaning device 36 towards the patch 37 in an entirely corresponding manner as discussed with respect to FIG. 8. In particular, the person U may perform the pushing gesture by pushing the autonomous vacuum cleaning device 36 at the current position 35'" on its navigation trajectory 33 into a direction pointing from the current position 35'" towards the patch 37. The controller 3 determines that a physical interaction with a person has occurred, that the physical interaction is a pushing gesture, and compute the direction vector 14 of the determined pushing gesture. The controller 3 will proceed by generating a suitable control signal 9.2 in order to control the running gear 5 of the autonomous vacuum cleaning device 36 to proceed on an amended navigation trajectory 33 by continuing on the new path segment 33.i guiding the autonomous vacuum cleaning device 36 towards the patch 37.

The embodiment of an autonomous lawnmower 1 discussed using the figures is one particular example of an autonomous working device implementing the claimed invention. All aspects and techniques may be applied in a similar manner to other types of autonomous working devices and service robots, for example the autonomous vacuum cleaning device 36, other types of floor cleaning robots, and window cleaning robots. These examples of autonomous working devices perform their allotted working task in restricted working areas 33 and typically have a base station 100 for recharging their batteries.

What is claimed is:

1. An autonomous working device, comprising:
at least one sensor configured to generate a sensor signal based on a physical interaction of the autonomous working device with a physical entity,
wherein the at least one sensor is configured to acquire the sensor signal measuring an acceleration in at least one direction;
at least one actuator configured to perform a working task; and
a controller configured to generate a control signal for controlling the actuator, to evaluate the sensor signal, to determine a pattern of a physical interaction of the autonomous working device with a person based on the evaluated sensor signal and to generate the control signal based on the determined pattern of the physical interaction,
wherein the at least one physical interaction includes at least one of a push of the autonomous working device into one direction, and a touching gesture into at least one direction on the housing of the autonomous working device, and
wherein the controller is configured to distinguish, based on the determined pattern of the physical interaction, between a collision event involving the autonomous working device and an object other than the person on the one hand and the push of the autonomous working device and the touching gesture on the other hand, and in response to the push or the touch gesture being determined, to compute a direction of the push or the touch gesture based on the acquired sensor signal,
wherein the controller is configured to distinguish between, in the acquired sensor signal, a short peak in a sensor signal curve of the acquired sensor signal as the collision event, and a flat profile in the sensor signal curve of the acquired sensor signal as the push or the touching gesture,
wherein the generated control signal includes data on at least one working parameter including at least data on a navigation trajectory of the autonomous working device in the working area based on the interpreted physical interaction, and
wherein the data on the navigation trajectory includes information on at least one of amending the navigation trajectory, directing the autonomous working device to a particular location, and indicating a new navigation trajectory.

2. The autonomous working device according to claim 1, wherein
the at least one sensor is configured to generate the sensor signal while the autonomous working device is operating in a mode different from a programming mode or learning mode.

3. The autonomous working device according to claim 1, wherein the at least one sensor further includes an inertial measurement unit IMU, or the at least one sensor further includes an acoustic sensor configured to detect a knocking gesture, or the at least one sensor further includes a member arranged externally accessible on the autonomous working device.

4. The autonomous working device according claim 1, wherein the at least one physical interaction further includes at least one of the followings:

a touching gesture on the housing of the autonomous working device into one direction, a knocking pattern on the housing of the autonomous working device, a lifting of the autonomous working device, and a shaking of the autonomous working device.

5. The autonomous working device according to claim 1, wherein the controller is configured to generate the control signal including the data on at least one working parameter based on the interpreted physical interaction, wherein the at least one working parameter further includes at least one of the followings:

data defining a working area, in which the autonomous working device performs the working task, and data on an operation mode of the autonomous working device.

6. The autonomous working device according to claim 5, wherein the data defining the working area includes information on at least one of amending the working area, indicating a new working area, and defining an inhibited area in the working area.

7. The autonomous working device according to claim 5, wherein the data on the operation mode includes information on at least one of a working mode, a pausing mode, a standby mode, a specific predefined working task, a specific predefined behavior, a surveillance mode, a tracing mode for the autonomous working device following a user, a storing mode for storing location data into a memory, the storing mode for storing situation data into the memory, an unlocking process, a programming mode and a training mode.

8. The autonomous working device according to claim 5, wherein the controller is configured to select or amend the data on the at least one working parameter based on the evaluated sensor signal.

9. The autonomous working device according to claim 5, wherein the controller is configured to select or amend at least one working parameter based on an evaluated further sensor signal obtained via a second sensor, in case the controller determines based on the evaluated sensor signal generated by a first sensor that a physical interaction of the autonomous working device with a person occurred.

10. The autonomous working device according to claim 1, wherein the autonomous working device comprises an output interface, and the controller is configured to generate and to output via the output interface a feedback signal to the person, wherein the feedback signal communicates the evaluated sensor signal generated based on the physical interaction.

11. The autonomous working device according to claim 1, wherein the actuator comprises at least one of the followings:

at least one working tool, and a running gear of the autonomous working device.

12. The autonomous working device according to claim 11, wherein the at least one working tool is at least one of a cleaning tool, a vacuum cleaning tool, an ironing tool, a mowing tool, and a maintenance tool.

13. The autonomous working device according to claim 1, wherein the controller is configured to determine a first pattern of a physical interaction based on the evaluated sensor signal generated based on a first physical interaction as a reward, and to determine a second pattern of a physical interaction based one the evaluated sensor signal generated based on a second physical interaction as a punishment, and the controller is configured to adapt a future behavior of the autonomous working device based on the determined first pattern and second pattern, in particular by using a training algorithm.

14. A method for controlling an autonomous working device, the autonomous working device comprising at least one sensor, at least one actuator for performing a working task, and a controller, the method comprising:

generating, by the at least one sensor, a sensor signal based on a physical interaction of the autonomous working device with a physical entity, wherein the at least one sensor acquires the sensor signal measuring an acceleration in at least one direction;

evaluating, by the controller, the sensor signal;

generating, by the controller, a control signal based on the evaluated sensor signal;

performing, by the actuator, the working task based on the generated control signal;

determining, by the controller, whether a pattern of a physical interaction of the autonomous working device with a person based on the evaluated sensor signal occurred, wherein the physical interaction includes at least one of a push of the autonomous working device into one direction, and a touching gesture into at least one direction on the housing of the autonomous working device;

distinguishing, by the controller, based on the determined pattern of the physical interaction between a collision event involving the autonomous working device and an object other than the person on the one hand and the push of the autonomous working device and the touching gesture on the other hand, and in response to the push or the touch gesture being determined, computing a direction of the push or the touching gesture based on the acquired sensor signal;

distinguishing, by the controller, between, in the acquired sensor signal, a short peak in a sensor signal curve of the acquired sensor signal as the collision event, and a flat profile in the sensor signal curve of the acquired sensor signal as the push or the touching gesture; and in response that the pattern of the physical interaction of the autonomous working device with a person is determined occurred, generating the control signal based on the evaluated sensor signal, wherein the generated control signal includes data on at least one working parameter including at least data on a navigation trajectory of the autonomous working device in the working area based on the interpreted physical interaction, and wherein the data on the navigation trajectory includes information on at least one of amending the navigation trajectory, directing the autonomous working device to a particular location, and indicating a new navigation trajectory.

15. A non-transitory computer readable medium storing a program with program-code causing a computer or digital signal processor to:

generate a sensor signal based on a physical interaction of the autonomous working device with a physical entity, wherein the sensor signal measures an acceleration in at least one direction;

evaluate the sensor signal;

generate a control signal based on the evaluated sensor signal;

perform the working task based on the generated control signal;

determine whether a pattern of a physical interaction of the autonomous working device with a person based on the evaluated sensor signal occurred, wherein the physical interaction includes at least one of a push of the autonomous working device into one direction, and a touching gesture into at least one direction on the housing of the autonomous working device;

distinguish, based on the determined pattern of the physical interaction, between a collision event involving the autonomous working device and an object other than the person on the one hand and the push of the autonomous working device and the touching gesture on the other hand, and in response to the push or the touch gesture being determined, compute a direction of the push or the touching gesture based on the acquired sensor signal;

distinguish between, in the acquired sensor signal, a short peak in a sensor signal curve of the acquired sensor signal as the collision event, and a flat profile in the sensor signal curve of the acquired sensor signal as the push or the touching gesture; and in response that the pattern of the physical interaction of the autonomous working device with a person is determined occurred, generate the control signal based on the evaluated sensor signal, wherein the generated control signal includes data on at least one working parameter including at least data on a navigation trajectory of the autonomous working device in the working area based on the interpreted physical interaction, and wherein the data on the navigation trajectory includes information on at least one of amending the navigation trajectory, directing the autonomous working device to a particular location, and indicating a new navigation trajectory.

16. The autonomous working device according to claim 1, wherein the at least one sensor includes a movable or force-sensitive cover of the autonomous working device.

* * * * *